United States Patent
Ruzon

(10) Patent No.: US 7,454,038 B1
(45) Date of Patent: Nov. 18, 2008

(54) USING DIRECTIONAL WEIGHTING FUNCTIONS WHILE COMPUTING OPTICAL FLOW THROUGH BELIEF PROPAGATION

(75) Inventor: Mark A. Ruzon, Mountain View, CA (US)

(73) Assignee: Adobe Systems Incorporated, San Jose, CA (US)

(*) Notice: Subject to any disclaimer, the term of this patent is extended or adjusted under 35 U.S.C. 154(b) by 726 days.

(21) Appl. No.: 10/993,982

(22) Filed: Nov. 18, 2004

(51) Int. Cl.
*G06K 9/00* (2006.01)

(52) U.S. Cl. ............... 382/107; 382/321; 345/166

(58) Field of Classification Search ........... 382/103, 382/106, 107, 140, 154, 155, 168, 174, 181, 382/184, 193, 194, 199–203, 232, 255, 260, 382/264, 274, 276, 286–288, 291, 305, 317–321, 382/100; 348/584; 375/240.16; 345/475, 345/530, 166
See application file for complete search history.

(56) References Cited

U.S. PATENT DOCUMENTS 5,808,695 A * 9/1998 Rosser et al. ............ 348/584
5,991,459 A * 11/1999 Fogel ..................... 382/264
6,628,715 B1 * 9/2003 Iu et al. ................ 375/240.16
6,636,220 B1 * 10/2003 Szeliski et al. ............ 345/475

OTHER PUBLICATIONS

Publication: "Efficient Belief Propagation for Early Vision", by P.F. Felzenszwalk and D.P. Huttenlocher, CVPR, vol. 1, 2004, pp. 261-268.1*

* cited by examiner

*Primary Examiner*—Seyed Azarian
(74) *Attorney, Agent, or Firm*—Robert C. Kowert; Meyerstons, Hood, Kivlin, Kowert & Goetzel, P.C.

(57) ABSTRACT

One embodiment of the present invention provides a system that uses directional weighting functions while computing optical flow for an image through belief propagation. The system operates by computing local velocity estimates for points in the image. The system also computes directional weighting functions for points in the image, wherein the directional weighting functions facilitate propagating information in a manner which can vary with direction. The system subsequently uses these directional weighting functions during a belief propagation process, which propagates the local velocity estimates between points in the image, and which computes an optical flow field for points in the image.

25 Claims, 7 Drawing Sheets

USING DIRECTIONAL WEIGHTING FUNCTIONS WHILE COMPUTING OPTICAL FLOW THROUGH BELIEF PROPAGATION

BACKGROUND

1. Field of the Invention

The present invention relates to techniques for computing apparent motion in sequences of images. More specifically, the present invention relates to a method and an apparatus for using directional weighting functions during a belief propagation process which computes an optical flow field for an image.

2. Related Art

In order to enable computer systems to process visual information, computer scientists have developed a number of techniques to represent visual motion. Many of these techniques involve computing "optical flow" for an image in a video sequence. An optical flow field is a two-dimensional velocity field describing apparent motion within an image, which results from the independent motion of objects in the image, or from motion of the observer, projected onto the image plane. The process of computing optical flow for an image in a video sequence involves analyzing differences between two or more successive images in the video sequence to determine the apparent motion of objects between the images.

Optical flow can be computed using a number of techniques. Some researchers have investigated techniques that use "belief propagation" to calculate optical flow. (see P. F. Felzenszwalb and D. P. Huttenlocher, "Efficient Belief Propagation for Early Vision," *CVPR*, vol. I, pp. 261-268, 2004.) Belief propagation has proven to be an effective technique for solving a large number of computer vision problems. It operates by associating pixels in an image with nodes in a belief propagation graph. During the belief propagation process, the system performs local computations for nodes in the belief propagation graph and iteratively communicates these "messages" to neighboring nodes.

Unfortunately, existing techniques for solving the optical flow problem (including the above-described belief propagation technique) have a number of shortcomings. One shortcoming is caused by the "aperture problem," which arises whenever a small neighborhood in an image does not sufficiently constrain the motion of that neighborhood. The aperture problem commonly occurs along edges of an object, where only the motion normal to the edge is known, and in textureless regions, where motion is unconstrained.

Moreover, the optical flow problem is exacerbated if information is passed across motion (object) boundaries, where discontinuities exist in the optical flow. Note that velocity information on one side of an object boundary is typically irrelevant for points that lie on the other side of the object boundary. For example, the velocities of points within an object are typically irrelevant in determining the velocity of points that lie outside of the object. Consequently, transferring this velocity information across object boundaries during the belief propagation process can cause optical flow computations to converge to erroneous results.

Hence, what is needed is a method and an apparatus that restricts information from being passed across motion boundaries during optical flow computations involving the belief propagation technique.

SUMMARY

One embodiment of the present invention provides a system that uses directional weighting functions while computing optical flow for an image through belief propagation. The system operates by computing local velocity estimates for points in the image. The system also computes directional weighting functions for points in the image, wherein the directional weighting functions facilitate propagating information in a manner which can vary with direction. The system subsequently uses these directional weighting functions during a belief propagation process, which computes an optical flow field for points in the image by propagating the local velocity estimates between points in the image.

In a variation on this embodiment, computing the directional weighting functions for points in the image involves computing directional sending functions (DSFs) for points in the image by analyzing the structure of the image surrounding the points, wherein a given DSF directs an associated point to propagate its information in a manner which can vary with direction. It also involves computing directional receiving functions (DRFs) for points in the image by measuring the uncertainty of the local velocity estimates for points, wherein a given DRF directs an associated point to accept messages more readily from some directions than others.

In a further variation, during the belief propagation process, passing a message from a node X to a node Y involves: creating an unweighted message at node X; calculating a weighting exponent by multiplying the value of the DSF for node X in the direction of node Y with the value of the DRF for node Y in the direction of node X; creating a weighted message by applying the weighting exponent to the unweighted message; and sending the weighted message from node X to node Y.

In a further variation, creating the unweighted message at node X involves multiplying: a data function for node X; a smoothness function between node X and node Y; and a product of all messages incoming into node X, except from node Y.

In a variation on this embodiment, prior to computing the local velocity estimates for points in the image, the system performs an initialization operation, which involves: creating data functions for points in the image; and creating smoothness functions between points in the image. It also involves initializing a belief propagation graph, wherein a node in the belief propagation graph is associated with a point in the image, and wherein the node is connected to other nodes that are associated with neighboring points in the image.

In a variation on this embodiment, computing a local estimate for the velocity of a point involves computing a local estimate for the velocity of a patch centered at the point.

In a variation on this embodiment, the system uses the computed optical flow to compute an apparent motion for one or more objects in the image.

In a variation on this embodiment, the system uses the computed optical flow field for points in the image to compute an apparent motion for one or more objects in the image.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

System that Uses Optical Flow

Figure 1:
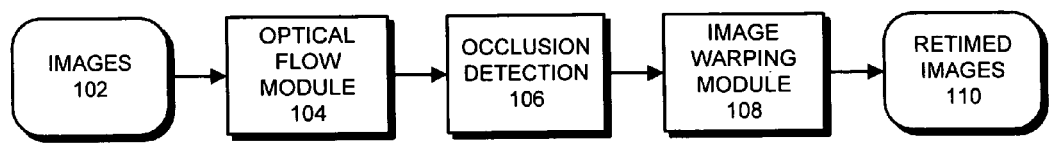
FIG. 1 illustrates an exemplary system which computes optical flow to retime a sequence of video images in accordance with an embodiment of the present invention.

FIG. 1 illustrates an exemplary system which computes optical flow to retime a sequence of video images in accordance with an embodiment of the present invention. This system feeds a sequence of video images 102 through an optical flow module 104, which generates optical flow between consecutive images. Next, the system feeds the images 102 through an occlusion detection module 106, which determines which portions of objects in the image are visible. Finally, the system feeds the images 102 along with the computed optical flow into an image warping module 108, which uses the computed optical flow to estimate the apparent velocities of objects in the images 102. Warping module 108 uses these apparent velocities to interpolate the locations of the objects while producing a set of retimed images 110. For example, the original sequence of images can be timed at 24 frames per second, while the retimed images 110 are timed at 30 frames per second.

Optical flow module 104 makes use of the belief propagation technique which is discussed in more detail with reference to FIGS. 2-9 below.

Belief Propagation Graph

Figure 2:
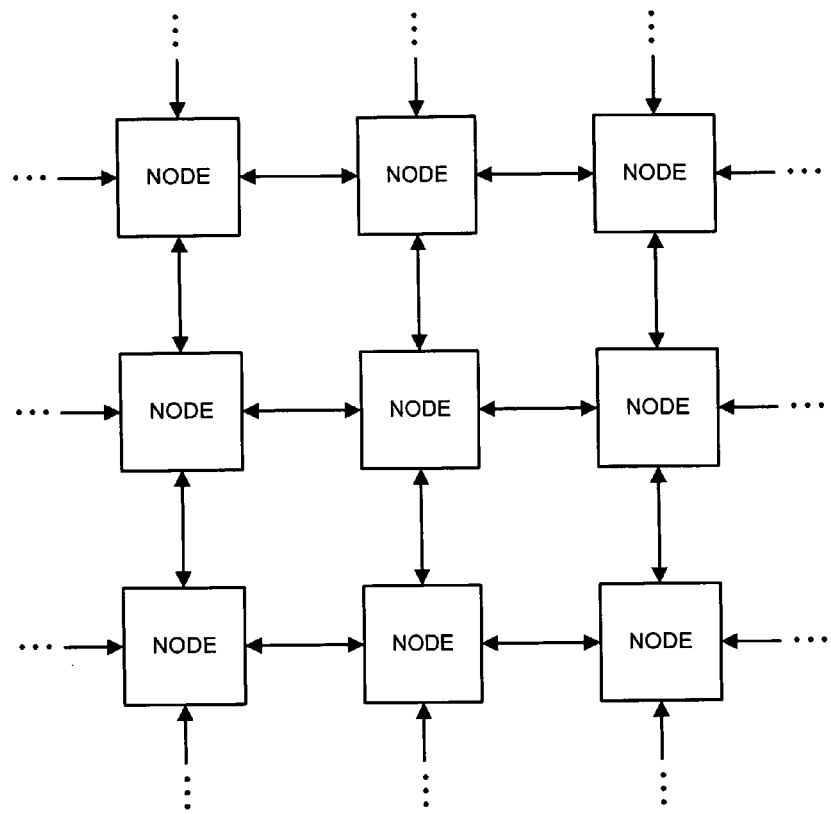
FIG. 2 illustrates an exemplary graph for the belief propagation process in accordance with an embodiment of the present invention.

FIG. 2 illustrates an exemplary graph for the belief propagation process in accordance with an embodiment of the present invention. Each node in this graph is associated with a corresponding pixel in the image. Furthermore, each node communicates with four adjacent neighboring nodes through the illustrated communication links. Note the graph illustrated in FIG. 2 is merely an exemplary graph. In general, many different types of graphs with different interconnection schemes can be used during the belief propagation process.

Belief Propagation for Optical Flow

To use the belief propagation (BP) technique for the optical flow problem, we can create a function at each node over the set of possible velocities that describes the local optical flow evidence for each patch in an image, taking uncertainty into account explicitly. We can also create a smoothness function between each pair of connected nodes describing the preference towards each pair of velocities. Messages passed between nodes are the product of these functions and other messages. Under suitable conditions, the messages will converge to produce the final velocities. Because the nodes in the graph send messages to their neighbors, the BP process implicitly assumes that all nodes have at least some information to contribute to the solution, and that receiving messages from all neighboring nodes will lead to a correct belief at each node.

Unfortunately, while computing optical flow, large regions of the image frequently do not have enough information to constrain associated image velocities. Evidence for the correct answer may be arbitrarily far away, while pixels from other objects with different velocities may be relatively near. Consequently, BP can fall into local minima when the information that gets to an uncertain node first has the dominant influence on its belief.

The present invention solves this problem by applying weighting functions to messages during the BP process. This technique is described in more detail below. However, before presenting the details of our solution to this problem, we first examine the causes of uncertainty in optical flow calculations.

The Aperture Problem

The "aperture problem" is a well-known problem that occurs during motion estimation. This problem arises whenever a small neighborhood in an image does not sufficiently constrain motion. It commonly occurs along edges, where only the motion normal to an edge is known, and in textureless regions, where the motion is unconstrained.

Figure 3:
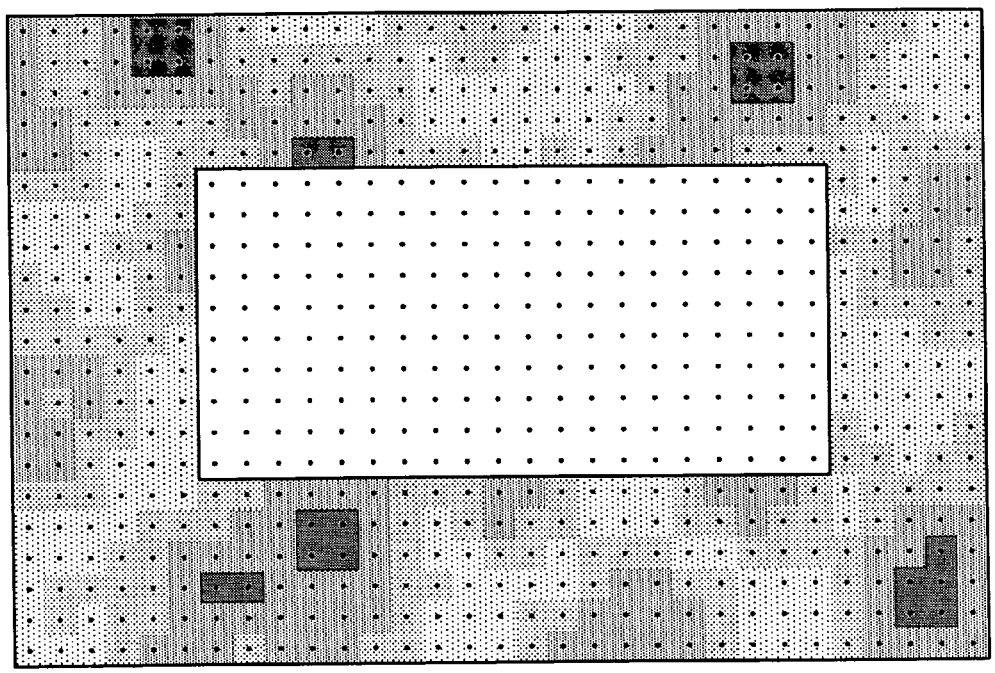
FIG. 3 illustrates an image in a video sequence in accordance with an embodiment of the present invention.
Figure 4:
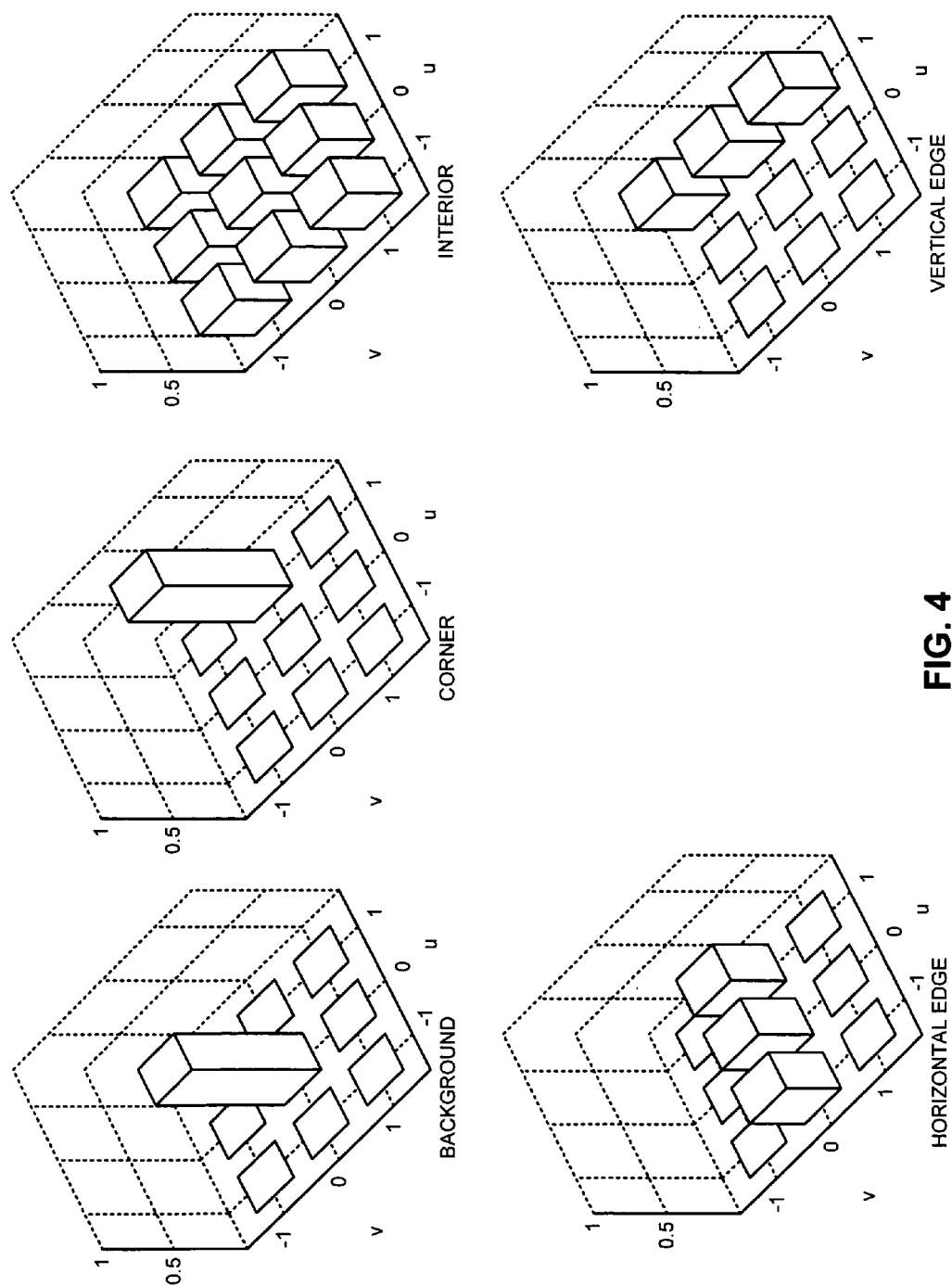
FIG. 4 illustrates ideal probability distributions for various pixels 10 in an image in accordance with an embodiment of the present invention.

FIG. 3 illustrates the aperture problem. A flat, axis-aligned, 10×20 rectangle is moving to the right at one pixel/frame against a static background. In theory, only the background and the four corners are certain of their motion. Pixels along the edges know one component of their motion, and pixels in the center do not know either. In FIG. 4, we quantify the inherent uncertainty in the motion of various points in this image as ideal probability distributions over velocity. In doing so, we restrict the set of velocities $\{(u, v)\}$ to the Cartesian product L×L where L=$\{-1, 0, 1\}$.

Figure 5:
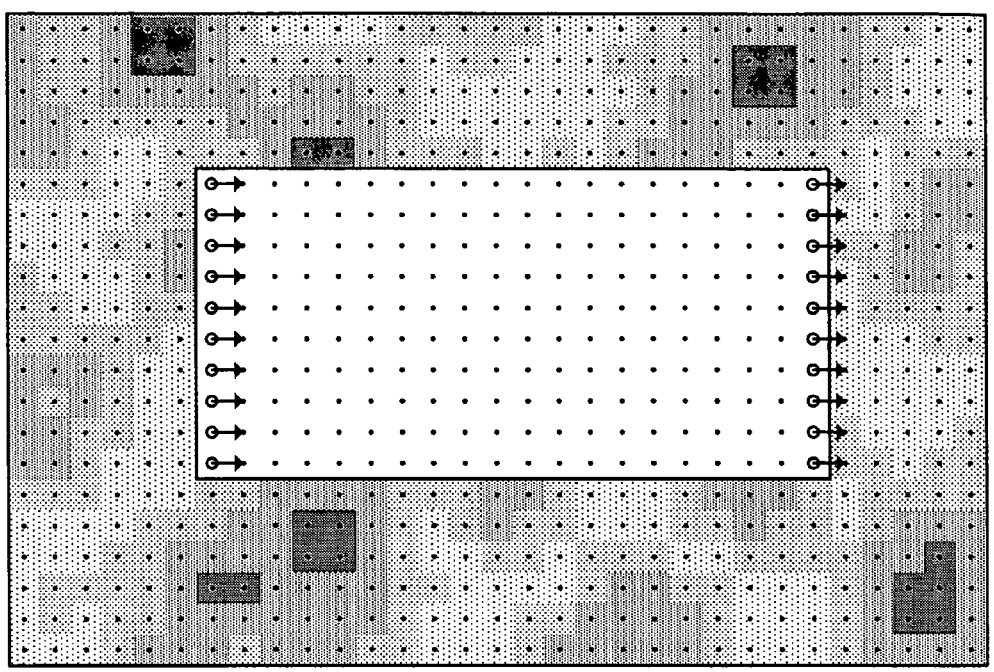
FIG. 5 illustrates how ordinary belief propagation converges to the wrong result.

If we run the BP algorithm using this set of 9 labels using the probability functions from FIG. 4 as our data functions, and the smoothness function described later, BP will not converge to the right answer but rather that of FIG. 5. Although the corners "know" the true answer for the entire rectangle with no uncertainty, the horizontal edges and interior region find the corner and background motions to be equally likely, and they align themselves with the majority.

To make this example work for rectangles of arbitrary size, we need some way of preventing or at least dampening the information being passed across motion boundaries. Such a mechanism would ideally allow messages to be passed along edges rather than across them, so that only the correct information propagates throughout the region. The following section describes such a mechanism.

Weighted Message Passing During Belief Propagation

The BP technique for optical flow and other vision problems constructs a graph where every pixel is a node connected to its four neighbors (see FIG. 2). In this graph, messages are passed from each node to each of its neighbors. The message that node i sends node j is updated by the following rule:

$$m_{ij}(x_j) \leftarrow \sum_{x_i} \phi_i(x_i) \psi_{ij}(x_i, x_j) \prod_{k \in N(i) \setminus j} m_{ki}(x_i) \quad (1)$$

where $\phi_i(x_i)$ is the data (evidence) function, $\psi_{ij}(x_i, x_j)$ is the smoothness (interaction) function, and the product is over all messages coming into node i except from node j. The messages need not be normalized but usually are for numerical reasons. We can assume they are always normalized to simplify the discussion. Once the messages have converged, the belief is a true probability distribution:

$$b_i(x_i) = k \phi_i(x_i) \prod_{j \in N(i)} m_{ji}(x_i), \quad (2)$$

where k is a normalizing constant. The label assigned to each node is a function of the belief, such as the maximum a posteriori (MAP) estimate or the minimum mean-squared error (MMSE) estimate.

Figure 6:
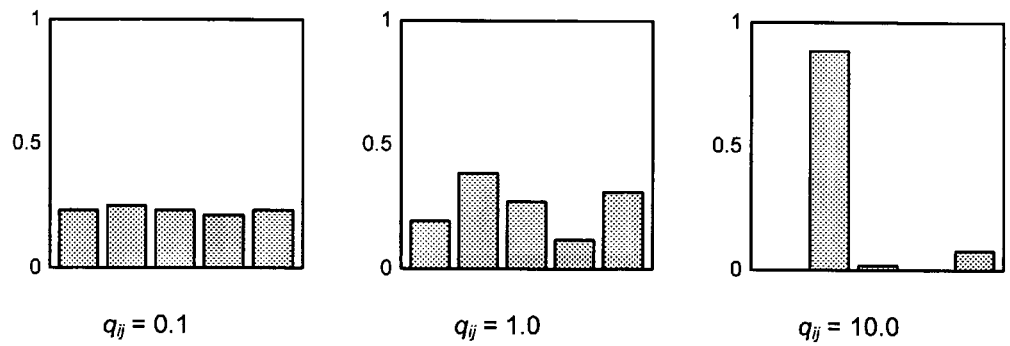
FIG. 6 illustrates effects of weighting a distribution by exponentiation in accordance with an embodiment of the present invention.

A correspondence has been shown between pairwise Markov Random Fields models (on which BP is founded) and the Potts model by appealing to Boltzmann's law from statistical physics:

$$p(\{x\}) = \frac{1}{Z} \exp\left\{\frac{-E(\{x_i\})}{T}\right\} \quad (3)$$

when the temperature T is 1. We can extend BP by considering other temperatures, and doing so locally to produce a revised message update equation:

$$m_{ij}(x_j) \leftarrow \left(\sum_{x_i} \phi_i(x_i) \psi_{ij}(x_i, x_j) \prod_{k \in N(i) \setminus j} m_{ki}(x_i)\right)^{q_{ij}} \quad (4)$$

where $q_{ij}$ is the non-negative weight assigned to the message. Raising a message to a power alters its entropy, as shown in FIG. 6. Smaller weights make a distribution more uniform, while larger weights make it more peaked. Since the ratios of probabilities, rather than their absolute magnitudes, are the key to creating the message, the entropy is inversely related to its impact on BP. In practice, there appears to be no need for weights larger than 1.

Computing good weights for all messages is no less challenging than creating good data and smoothness functions for a given problem. A common choice in many problems is to discourage strong connections between nodes with a spatial gradient between them. While other methods, such as graph cuts, can solve some optical flow problems with gradient-based penalties, we choose to specify the weights based on the optical flow measurements. Most intensity edges in a frame are not motion boundaries, so the propagation would be needlessly slowed. Assuming a measurement of the variance ($\sigma_x$, $\sigma_y$) in the image velocities initially computed as part of the data function, we can create a Directional Receiving Function (DRF) that governs how much a node will "listen" to the messages coming into it from different directions represented by $\theta$. One possible form for a DRF is a general sinusoid, $$RRF(\theta) = f(\sigma_x, \sigma_y) = f_{max} \cos(2(\theta - \omega)) + d, \quad (5)$$

with the following parameters:

$$f_{max} = \frac{1}{2}(1 - \exp\{-(M/m - 1)/\alpha\}) \quad (6)$$

$$\omega = \begin{cases} 0 & \text{if } \sigma_x < \sigma_y \\ \frac{\pi}{2} & \text{otherwise,} \end{cases} \quad (7)$$

$$d = (1 - 2f_{max})(1 - \exp\{-M/\beta\}) + f_{max}, \quad (8)$$

$$M = \max(\sigma_x, \sigma_y), \quad (9)$$

$$m = \min(\sigma_x, \sigma_y). \quad (10)$$

These parameters keep the DRF in the range [0,1]. The amplitude, $f_{max}$, is a function of the eccentricity of the variance. It is maximized at motion boundaries. $\omega$ adjusts the DRF to be maximized in either the x- or y-orientations depending on the type of edge. d is restricted to fall in a range centered at 0.5 that is larger when $f_{max}$ is small. It is dependent on the overall amount of uncertainty.

Figure 7:
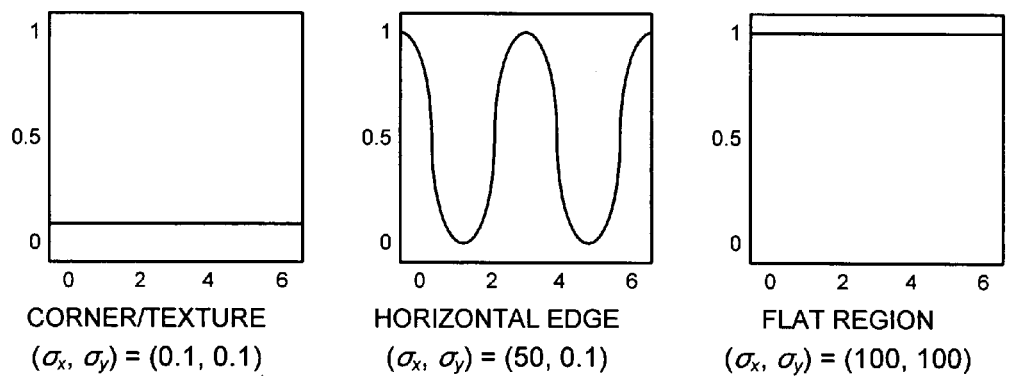
FIG. 7 illustrates directional receiving functions for three idealized image structures in accordance with an embodiment of the present invention.
Figure 8:
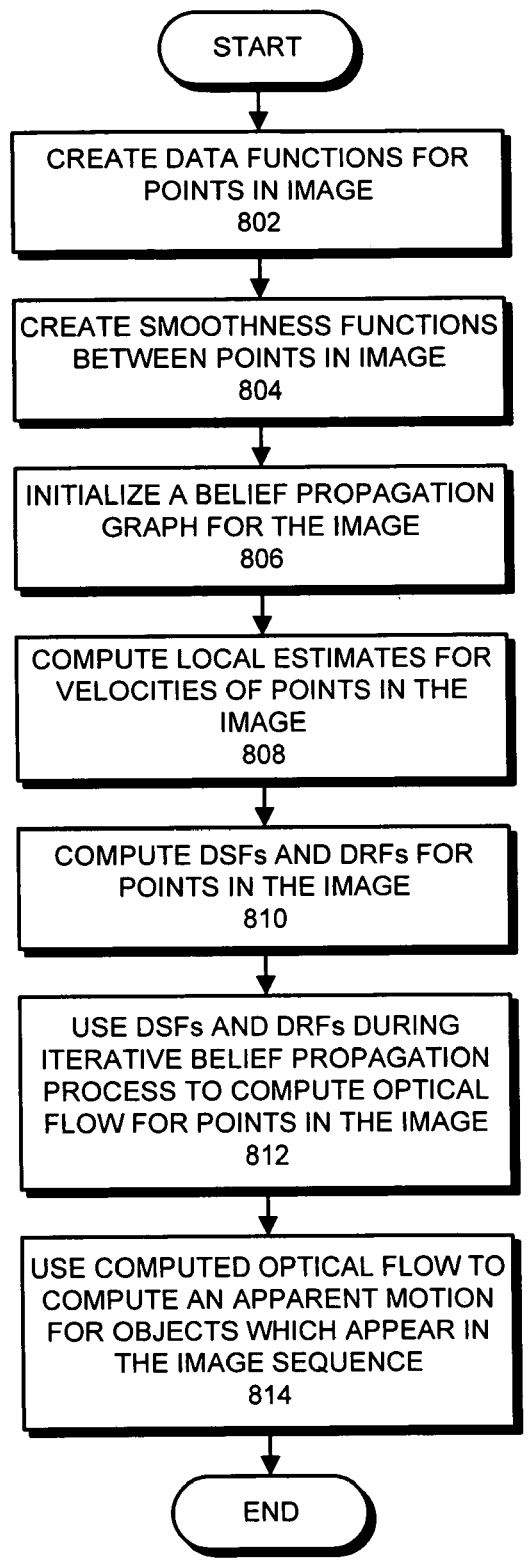
FIG. 8 presents a flow chart illustrating an optical flow process, which uses DSFs and DRFs, in accordance with an embodiment of the present invention.

FIG. 7 graphically explains the intuition behind these parameters. At corners or in textured regions, the variance is small in both directions, resulting in a DRF that is a small constant value. At an edge the variance is large along it but small across it, so that the node will readily receive messages from other edge pixels. In flat regions the variance is large everywhere, and the DRF is a large constant value. To compute $q_{ij}$ we evaluate the DRF at 0, $\pi/2$, $\pi$, and $3\pi/2$ for the right, up, left, and down messages, respectively.

In summary, the BP process generally operates as follows. Before the BP process starts, the system performs a number of initialization operations. These initialization operations include: creating data functions for points in the image (step 802), and creating smoothness functions between points in the image (step 804). They also include initializing a belief propagation graph for the image (step 806), which involves constructing a graph with a node for each pixel as is illustrated in FIG. 2.

During the BP process, the system first computes local estimates for the velocities of points in the image (step 808).

Next, the system computes directional receiving functions (DSFs) and directional sending functions (DRFs) for points in the image (step 810). For example, a DSF can be generated so that:

(1) at a point that corresponds to the corner of an object, the DSF has values near 1 over the interval corresponding to the subtending angle of the corner, falling off to 0 elsewhere;

(2) at a point along an edge, the DSF has values near 1 at orientations along the edge, and lesser values at orientations perpendicular to it; and (3) in a textureless region, the DSF is close to zero everywhere.

Furthermore, the DRF can be generated so that:

(1) at a corner, the DRF is close to zero everywhere;

(2) at an edge, the DRF has values near 1 at orientations along the edge and 0 at orientations perpendicular to it; and (3) in a textureless region, the DRF is close to 1 everywhere.

Next, the system uses the DRFs and the DSFs during an iterative belief propagation process to compute an optical flow field for points in the image (step 812). (For more details on the BP process, see P. F. Felzenszwalb and D. P. Huttenlocher, "Efficient Belief Propagation for Early Vision," *CVPR*, vol. I, pp. 261-268, 2004.) Finally, the system uses the computed optical flow to determine apparent motions for objects in the image (step 814).

Results

To generate suitable values for both the weights and the data function, it is useful to have an optical flow formulation that represents uncertainty explicitly. For example, we can choose Simoncelli's Gaussian formulation (see E. Simoncelli, "Bayesian multi-scale differential optical flow," *Handbook of Computer Vision and Applications*, Chapter 14, pp. 297-322, Academic Press, 1999):

$$P(\vec{f} \mid I_x, I_y, I_t) = \exp\left\{\frac{-(\vec{\mu}_f - \vec{f})^T \Lambda_f^{-1}(\vec{\mu}_f - \vec{f})}{2}\right\}. \tag{11}$$

This equation states that the probability that a (5×5) patch is moving with velocity $\vec{f}$ given the spatiotemporal derivatives is modeled by a Gaussian with mean $\vec{\mu}_f$ and covariance $\Lambda_f$. We used his binomial weighting over the patch with a prior of $\lambda_p=100$ pixels and variances $\lambda_1=1$ and $\lambda_2=0.1$. We can sample the resulting Gaussian at the vectors specified by the labels to create $\phi_i(x_i)$ at each node, and the diagonal terms of $\Lambda_f$ are $\sigma_x$ and $\sigma_y$. To compute the spatiotemporal derivatives we can use the facet model, where we fit discrete Chebyshev polynomials over a 3×3×3 patch.

Figure 9:
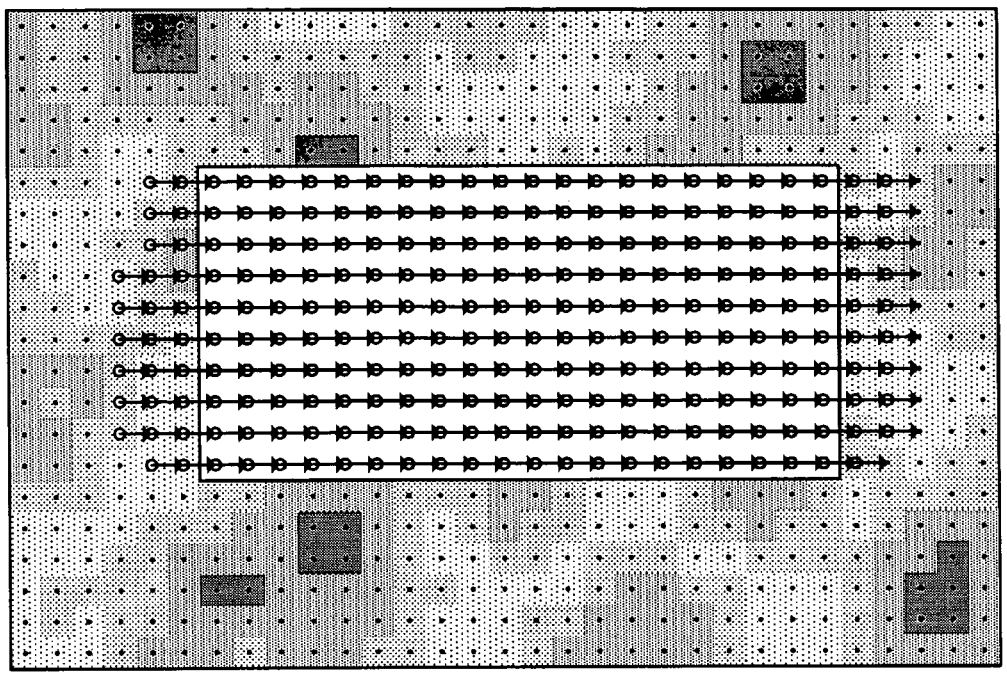
FIG. 9 illustrates an optical flow field computed using a belief propagation process with weighted message passing in accordance with an embodiment of the present invention.

Note that we carefully choose a smoothness function to avoid bias, which creates non-uniform messages even in areas of complete uncertainty. To avoid the creation of strong beliefs in places before any actual information propagates there, $\omega(x_i, x_j)$ (we drop the subscripts) should ideally have the following properties:

$$\forall j, \sum_{x_i} \psi(x_i, x_j) = c, \tag{12}$$

$$\forall i,j,k,l \text{ such that } \|x_i-x_j\| \geq \|x_k-x_l\|, \psi(x_i,x_j) \leq \psi(x_k,x_l), \tag{13}$$

with equality holding if (but not only if) the distances are equal. Note that (12) prevents bias toward any one label, while (13) preserves symmetry of transitioning between any label pair. Because our labels are arranged as a finite set of points on a two-dimensional grid of image velocities, there are few choices for this function that satisfy the above properties. We can choose:

$$\psi(x_i, x_j) = \begin{cases} 1 & \text{if } x_i = x_j \\ 1/|L \times L| & \text{otherwise,} \end{cases} \tag{14}$$

where L×L is the set of labels. The function is of a form allowing efficient implementation; however, its equal treatment of all unequal pairs of labels is not ideal. Results for the rectangle using weighted message passing with $\alpha=32$ and $\beta=0.5$ are shown in FIG. 9. All MAP estimates inside the rectangle are correct, but some pixels in the background have non-zero velocities. This result should be expected since optical flow is computed over patches, smoothing the flow field, and BP never refers to the actual images.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for computing optical flow for an image through belief propagation, comprising:
   computing local velocity estimates for points in the image;
   computing directional weighting functions for points in the image, wherein the directional weighting functions facilitate propagating information in a manner which can vary with direction; and
   using the directional weighting functions during a belief propagation process, which propagates the local velocity estimates between points in the image, and which computes an optical flow field for points in the image.

2. The method of claim 1, wherein computing the directional weighting functions for points in the image involves:
   computing directional sending functions (DSFs) for points in the image by analyzing the structure of the image surrounding the points, wherein a given DSF directs an associated point to propagate its information in a manner which can vary with direction; and
   computing directional receiving functions (DRFs) for points in the image by measuring the uncertainty of the local velocity estimates for points, wherein a given DRF directs an associated point to accept messages more readily from some directions than others.

3. The method of claim 2, wherein during the belief propagation process, passing a message from a node X to a node Y involves:
   creating an unweighted message at the node X;
   calculating a weighting exponent by multiplying the value of the DSF for the node X in the direction of the node Y with the value of the DRF for the node Y in the direction of the node X;
   creating a weighted message by applying the weighting exponent to the unweighted message; and
   sending the weighted message from the node X to the node Y.

4. The method of claim 3, wherein creating the unweighted message at the node X involves multiplying:
   a data function for the node X;

a smoothness function between the node X and the node Y; and a product of all messages incoming into the node X, except from the node Y.

5. The method of claim 1, wherein prior to computing the local velocity estimates for points in the image, the method further comprises performing an initialization operation, which involves:

creating data functions for points in the image;

creating smoothness functions between points in the image; and initializing a belief propagation graph, wherein a node in the belief propagation graph is associated with a point in the image, and wherein the node is connected to other nodes that are associated with neighboring points in the image.

6. The method of claim 1, wherein computing a local estimate for the velocity of a point involves computing a local estimate for the velocity of a patch centered at the point.

7. The method of claim 1, further comprising using the computed optical flow for points in the image to compute an apparent motion for one or more objects in the image.

8. The method of claim 1, wherein computing the local velocity estimates involves examining successive images in an image sequence.

9. A computer-readable storage medium storing instructions that when executed by a computer cause the computer to perform a method for computing optical flow for an image through belief propagation, the method comprising:

computing local velocity estimates for points in the image;

computing directional weighting functions for points in the image, wherein the directional weighting functions facilitate propagating information in a manner which can vary with direction; and using the directional weighting functions during a belief propagation process, which propagates the local velocity estimates between points in the image, and which computes an optical flow field for points in the image.

10. The computer-readable storage medium of claim 9, wherein computing the directional weighting functions for points in the image involves:

computing directional sending functions (DSFs) for points in the image by analyzing the structure of the image surrounding the points, wherein a given DSF directs an associated point to propagate its information in a manner which can vary with direction; and computing directional receiving functions (DRFs) for points in the image by measuring the uncertainty of the local velocity estimates for points, wherein a given DRF directs an associated point to accept messages more readily from some directions than others.

11. The computer-readable storage medium of claim 10, wherein during the belief propagation process, passing a message from a node X to a node Y involves:

creating an unweighted message at the node X;

calculating a weighting exponent by multiplying the value of the DSF for the node X in the direction of the node Y with the value of the DRF for the node Y in the direction of the node X;

creating a weighted message by applying the weighting exponent to the unweighted message; and sending the weighted message from the node X to the node Y.

12. The computer-readable storage medium of claim 11, wherein creating the unweighted message at the node X involves multiplying:

a data function for the node X;

a smoothness function between the node X and the node Y; and a product of all messages incoming into the node X, except from the node Y.

13. The computer-readable storage medium of claim 9, wherein prior to computing the local velocity estimates for points in the image, the method further comprises performing an initialization operation, which involves:

creating data functions for points in the image;

creating smoothness functions between points in the image; and initializing a belief propagation graph, wherein a node in the belief propagation graph is associated with a point in the image, and wherein the node is connected to other nodes that are associated with neighboring points in the image.

14. The computer-readable storage medium of claim 9, wherein computing a local estimate for the velocity of a point involves computing a local estimate for the velocity of a patch centered at the point.

15. The computer-readable storage medium of claim 9, wherein the method further comprises using the computed optical flow for points in the image to compute an apparent motion for one or more objects in the image.

16. The computer-readable storage medium of claim 9, wherein computing the local velocity estimates involves examining successive images in an image sequence.

17. An apparatus that computes optical flow for an image through belief propagation, comprising:

a velocity computing mechanism configured to compute local velocity estimates for points in the image;

a directional weighting function mechanism configured to compute directional weighting functions for points in the image, wherein the directional weighting functions facilitate propagating information in a manner which can vary with direction; and a belief propagation mechanism which propagates the local velocity estimates between points in the image, and which computes an optical flow field for points in the image, wherein the belief propagation mechanism is configured to use the directional weighting functions during a belief propagation process.

18. The apparatus of claim 17, wherein the directional weighting function mechanism is configured to:

compute directional sending functions (DSFs) for points in the image by analyzing the structure of the image surrounding the points, wherein a given DSF directs an associated point to propagate its information in a manner which can vary with direction; and to compute directional receiving functions (DRFs) for points in the image by measuring the uncertainty of the local velocity estimates for points, wherein a given DRF directs an associated point to accept messages more readily from some directions than others.

19. The apparatus of claim 18, wherein the belief propagation mechanism is configured to pass a message from a node X to a node Y by:

creating an unweighted message at the node X;

calculating a weighting exponent by multiplying the value of the DSF for the node X in the direction of the node Y with the value of the DRF for the node Y in the direction of the node X;

creating a weighted message by applying the weighting exponent to the unweighted message; and sending the weighted message from the node X to the node Y.

20. The apparatus of claim 19, wherein while creating the unweighted message at the node X, the belief propagation mechanism is configured to multiply:
- a data function for the node X;
- a smoothness function between the node X and the node Y; and
- a product of all messages incoming into the node X, except from the node Y.

21. The apparatus of claim 17, wherein the apparatus further includes an initialization mechanism, which is configured to:
- create data functions for points in the image;
- create smoothness functions between points in the image; and to
- initialize a belief propagation graph, wherein a node in the belief propagation graph is associated with a point in the image, and wherein the node is connected to other nodes that are associated with neighboring points in the image.

22. The apparatus of claim 17, wherein while computing a local estimate for the velocity of a point, the velocity computing mechanism is configured to compute a local estimate for the velocity of a patch centered at the point.

23. The apparatus of claim 17, further comprising a motion computing mechanism, which is configured to use the computed optical flow for points in the image to compute an apparent motion for one or more objects in the image.

24. The apparatus of claim 17, wherein while computing the local velocity estimates, the velocity computing mechanism is configured to examine successive images in an image sequence.

25. A method for computing an apparent motion for one or more objects in an image in a sequence of images, comprising:
- examining the image in the sequence of images;
- computing local velocity estimates for points in the image;
- computing directional weighting functions for points in the image, wherein the directional weighting functions facilitate propagating velocity information in a manner which can vary with direction;
- using the directional weighting functions during a belief propagation process, which propagates the local velocity estimates between points in the image, and which computes an optical flow field for points in the image; and
- using the computed optical flow field for points in the image to compute an apparent motion for one or more objects in the image.

* * * * *